United States Patent [19]

Hermann

[11] Patent Number: 5,405,648
[45] Date of Patent: Apr. 11, 1995

[54] COATING PARTICULATE MATERIAL WITH A POLYMER FILM

[76] Inventor: Paul F. Hermann, 21 Fieldstone Dr., Dover, N.H. 03820

[21] Appl. No.: 59,134

[22] Filed: May 10, 1993

[51] Int. Cl.$^6$ .................. B01J 13/18; B01J 13/20; B05D 7/00
[52] U.S. Cl. ............... 427/213.31; 427/213.34; 427/214; 427/221; 428/406; 512/4; 524/494; 524/589
[58] Field of Search ............ 427/213.31, 213.34, 427/221, 214; 524/494, 589; 428/406; 512/4

[56] References Cited

U.S. PATENT DOCUMENTS

| | | | |
|---|---|---|---|
| 3,175,935 | 3/1965 | Vanstrum | 427/202 X |
| 3,384,680 | 5/1968 | Lussow | 427/212 X |
| 3,837,892 | 9/1974 | Marzocchi | 427/214 X |
| 3,891,572 | 6/1975 | Moody et al. | 427/213.34 |
| 3,956,230 | 5/1976 | Gaylord | 427/214 X |
| 4,333,743 | 6/1982 | Nojima | 427/221 X |
| 4,415,630 | 11/1983 | Kubota et al. | 427/221 X |
| 4,438,239 | 3/1984 | Rembaum et al. | 424/501 X |
| 4,608,277 | 8/1986 | Greiner et al. | 427/213.3 |
| 4,659,753 | 4/1987 | Tiburtius et al. | 524/494 X |

*Primary Examiner*—Richard D. Lovering
*Attorney, Agent, or Firm*—Frederick R. Cantor

[57] ABSTRACT

Solid particles are coated with a polymer coating, by a process that includes, dispersing the uncoated particles in water, containing a wetting agent, adding a liquid polymer coupling agent, so that the dispersed solid particles have a film of the coupling agent, and agitating the mixture while adding a prepolymer. The coupling agent is reacted with the polymer to form polymer coatings on the dispersed particles. Relatively thin polymer coatings can be achieved by this process. As an extension of the process, the core particles can be materials used for abrasive blast cleaning, filtration, separation catalysis, animal feed, drug dispensing, contacting, tumble cleaning, and slow release of active ingredients.

14 Claims, 1 Drawing Sheet

COATING PARTICULATE MATERIAL WITH A POLYMER FILM

BACKGROUND OF THE PRESENT INVENTION

The present invention, relates to a process for forming a thin polymer film on solid particulate material.

The present invention, more particularly relates to process for forming a thin polymer film on solid particulate material used in abrasive blast cleaning.

Abrasive blast cleaning is used for various purposes, including the removal of rust and paint from work surfaces, or roughening the surfaces of work pieces, prior to painting, or coating the surfaces, or removing burrs and flash from molded parts, or cutting, and/or carving, selected areas in glass.

The abrasive particles used in abrasive blast cleaning, are selected, in accordance with the work piece material, and its size and shape. Other factors are the finish desired, and the nature of the material to be removed from the work piece, e.g., rust, scale, or paint. Abrasives are commonly formed from such materials as metallic grit, metallic shot, silica, sand, glass, staurolite, garnet, coal slag, walnut shells, plastic beads, aluminum oxide, silicon carbide, and cut wire. The preceding materials are typically grouped as manufactured, naturally occurring, or mineral slag, abrasives.

The abrasive particles will have various diameters, or sizes, depending on the work piece material, and desired finish. Typically, the particle diameter will vary between about two one-thousandths (0.002) of an inch and about one-half (0.5) of an inch. The particles can be spherical, or sharp-edged, depending on the process used to form the particles. In general, a smaller size particle will produce a smoother surface finish, whereas a larger size abrasive particle will produce a rougher surface. The abrasive impact force of the particle is a factor in the cleaning action. The impact force is a function of the particle size, and particle density, i.e., larger and denser particles, will have a greater impact force, and a more efficient abrasive cleaning action.

The abrasive particles can be propelled against the work piece, by means of an airless, abrasive, blast wheel, or a pressure blast nozzle.

One problem associated with abrasive blast cleaning is the formation of fine dust, due to breakdown, or fracture of the abrasive particles, e.g., by the impact of one particle against another, i.e, impact against substrate or removal of substrate. Premature formation of the fine particle dust is undesirable, in that it adds dust to the environment, reduces the service life of the abrasive material, and increases the dust disposal costs. Also, the fine dust must be removed from the usable abrasive particles, before the particles are recycled back through the propelling device, i.e., the blast wheel or blast nozzle. Further, the fine particle dust poses the possibility of an explosion.

Another problem with presently known abrasive particles, is that, for certain types of work pieces, the particles do not have the desired combination of absorption surface hardness, and density. In some situations, it is desired that the abrasive particle have a relatively soft surface, while at the same time having a relatively high density. The soft particle surface is necessary, to produce a relatively smooth surface finish, on the work piece. Softer abrasive particles are, also, less destructive to the walls of the propelling device. A relatively high abrasive particle density is desirable, in that it contributes to a higher impact force, and a quicker, more efficient, cleaning action. As stated above, materials commonly used for the abrasive particles do not have the desired combination of soft, i.e., low, surface hardness, and a high density.

Such materials as staurolite, garnet, steel shot, and ground glass have a relatively high density. However, such materials have a relatively high surface hardness. Materials such as, walnut shells, corn cobs, and plastics, have a relatively soft, or non-aggressive, surface. However, such materials have a relatively low density.

The use of various resin particles as abrasive blast cleaning media is known. For example, U.S. Pat. No. 4,545,155, issued to J. Nakata, discloses a method of abrasive blast cleaning wherein the abrasive media comprises a slurry, containing a synthetic resin abrasive, water, and a non-ionic surfactant.

U.S. Pat. No. 3,313,067, issued to D. Smith et al., discloses a cleaning method, wherein discrete particles of polycarbonate resin are used as the blast cleaning agent.

U.S. Pat. No. 4,731,125, issued to L. Carr, discloses the use of urea formaldehyde particles as a blast cleaning media.

The present invention relates to a process for forming abrasive particles, wherein the absorption density and surface hardness can be independently controlled. For example, under the present invention, it is possible to obtain a particle having a high density, low surface hardness, and the capability of absorption.

Prior art, as in U.S. patent application, Ser. No. 07/757,977, (now allowed as U.S. Pat. No. 5,256,703), taught the art of imbedding abrasives in urethane foam, to prevent fracture and absorb dust. The prior art was limited to abrasive inorganic, minerals, 66% solids filler, and was unusable in conventional abrasive blast machines.

The present invention also relates to a process to form a thin film of polymer on solid particulate, where the polymer film contains a third component active ingredient.

The present invention further relates to formation of a thin polymer film onto absorbent particulates, pretreated with absorbate, so as to allow the slow release of the absorbate.

SUMMARY OF THE PRESENT INVENTION

The primary object of the present invention, is to provide a process for forming a thin polymer film on solid particulate material.

A further object of the present invention, more particularly, is to provide a process for forming a thin polymer film on solid particulate material used in abrasive blast cleaning.

The present invention, as used for abrasive blast cleaning contemplates the formation of abrasive particles, wherein the core of each particle is formed out of one material, and the surface of each particle is formed out of a urethane elastomer. The use of different materials for the abrasive core, permits the particle to have varied density, hardness, e.g., a high density, and a low surface hardness. The use of different materials for the core and the particle surface, also permits the particles to have other desirable selected qualities, such as absorption, and a high fracture resistance. In this connection, it should be noted, that some dense materials, such as glass, are relatively brittle, and subject to fracture. By encapsulating a dense, brittle, material within a tougher, and more resilient, shell material, it is possible to increase the fracture resistance of the composite particle. The particle is, thus, less likely to break apart, when it impacts the work surface, or another abrasive particle.

When composite, i.e., coated, particles are used in abrasive blast cleaning, it is believed that the resilient shell on each abrasive particle may undergo a slight compaction when the particle impacts the work surface. During the compaction process, the particle will momentarily remain in contact with the work surface, thereby delivering an increased quantity of energy to the work surface. The increased energy input to the work surface will tend to enhance the cleaning, or scouring effect, of the abrasive particles.

Composite abrasive particles can be formed by a process that includes dispersing uncoated particulates in water, adding a liquid coupling agent to the particle-water slurry, so that the coupling agent is reacted onto the particle surfaces, and, thereafter, adding a liquid urethane prepolymer, to the mixture, so that the prepolymer chemically reacts with the coupling agent, already bonded on the particle surfaces. A thin polymer coating is, thus, formed on the particle surfaces. Various plastic monomers and coupling agents can be used. A preferred monomer is urethane, and a preferred reactive coupling agent is organosilicone (silane).

In preferred practice of the present invention, the particle-water slurry contains a minor quantity of a surfactant, i.e., a wetting agent, to promote adherence of the reactive coupling agent, on the particle surfaces. The concentration of the plastic monomer, i.e., prepolymer, in the liquid mixture is, preferably, less than two and one-half (2.5) percent, such that the final polymer coating is a relatively thin film on the particle surfaces. The quantity of liquid monomer used is related to the total surface area of the particulates in the water-particulate slurry. Thus, the particle size is a factor in the quantity of plastic monomer used.

Preferably, the process is carried out so that a major percentage of the particles are individually coated with the polymer film, i.e, each particle is individually coated. The process is designed to discourage agglomeration of particles within the encapsulating film.

The particle coating process of the present invention can be applied to particles used for purposes other than abrasive blast cleaning. In this connection, it should be noted that particulate materials are used for such purposes as filtration, separation, contacting, gas-liquid adsorption processes, tumble cleaning, catalysis, animal feed supplements, and controlled release of drugs within the human body. Coated particulates with an added active ingredient contained in the coating, could be advantageously used in such processes, or applications. Therefore, the present invention teaches a particle coating process, that could be applicable to various types of particles, i.e., particles used for other purposes than abrasive blast cleaning.

A particular difference in the process for purposes other than abrasive blast cleaning, is that it creates a composite media, consisting of an inert core, coated with a thin film of polymer. The polymer film will contain and bond a third component active ingredient to the core material. The core material is an inert material, e.g., a glass bead, varying in size from twelve one-hundreths (0.12) of an inch to one-half (0.5) of an inch in diameter. Changing the diameter controls pressure drop of the effluent stream through the media. Containing the active ingredient on the outside of the inert core puts it in closer communication with the effluent. The particle size of the active ingredient is generally ten (10) to one-hundred (100) times smaller than the core. Reduction of particle size of the active ingredient increases the surface area of the active ingredient.

The process to create the composite media consists of coating the core inert material, such as a one-half (0.5) inch diameter glass bead, per the above process. A secondary step, using the one-half (0.5) inch diameter glass bead as the core ingredient and adding an active ingredient, i.e., silane, water surfactant, and polymer, results in a composite material, as shown later, in FIG. 4, and Example 7.

An active ingredient is described as any solid, or liquid, material advantageous in carrying out the process applications mentioned above, such as: molecular sieves; activated carbon; catalysts; enzymes; proteins; plant cells; microbes; complexing agents; adsorbants; absorbants; detergents; fragrances; chelating agents; algae; and numerous other mass transfer ingredients.

DESCRIPTION OF THE PREFERRED EMBODIMENTS OF THE PRESENT INVENTION

Figure 1:
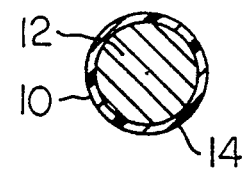
FIG. 1, is a sectional view, taken through a resin-coated particle, formed by the process of the present invention.

FIG. 1, is a sectional view, taken through a resin-coated particle, formed by the process of the present invention.

Referring now to FIG. 1, there is shown a composite abrasive particle 10, that is useful in abrasive blast cleaning. Particle 10, includes a spherical core 12, and a polymer coating 14. Core 12, can be any material commonly used for abrasive particles, used in abrasive blast cleaning, e.g., steel shot, glass bead, etc. The polymer coating 14, can be a plastic thermosetting resin, such as polyurethane, acrylic, epoxy, and polyester thermoset. The preferred coating material is polyurethane.

Figure 2:
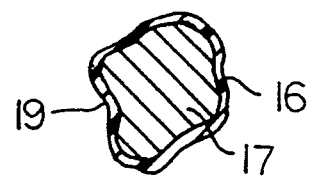
FIG. 2, is a sectional view, taken through another polymer-coated particle, produced by the process of the present invention.

FIG. 2, is a sectional view, taken through another polymer-coated particle, produced by the process of the present invention.

FIG. 2, shows another composite abrasive particle 16, that comprises an irregularly shaped core 17, and a polymer coating 19. Core 17, can be a commonly used abrasive material such as steel grit, ground glass, silicon carbide, silica sand, ground coal slag, or aluminum oxide. Polymer coating 19, can, if desired, be the same material as that used for polymer coating 14.

The composite particles depicted in FIGS. 1 and 2, typically, have diameters ranging in size from about two one-thousandths (0.002) of an inch, to about one-half (0.5) of an inch. The shape of the particle, either spherical or irregular, is related to the core material, and the process used in forming the particle core. The polymer coating 14 or 19, is formed in situ, on the core surface.

The overall density of the composite particle is determined, primarily, by the density of the core material, rather than by the density of the coating material. By selecting a core material that has a relatively high density, it is possible to achieve a composite particle, having a reasonably high overall density. As previously noted, the impact force, and scouring action, of an abrasive particle is related, to a great extent, to the particle density.

The polymer coating on the high density core, provides absorption of dust and oil, as well as, a relatively soft surface hardness, that tends to reduce the aggressiveness of the cleaning action, and the roughness of the cleaned surface. The polymer coating, also, tends to have a lessened degrading effect, on the surfaces of the abrasive blast cleaning equipment, i.e., a lesser abrasive wear of the equipment surfaces, as the particles are discharged, recaptured, cleaned, and recycled for reuse.

A further feature of the polymer coating is its encapsulating function, that serves to prevent premature fracture, or break up, of the core material. Typically, the core material is hard, but brittle. The polymer coating is somewhat softer, tougher, and more resilient, such that the coating tends to absorb shock forces, generated when the particle impacts the work surface, or other particles. By preventing premature fracture of the particle, the coating prolongs the particle service life, and minimizes the formation of undesired fine dust particles, that are potentially explosive, and too small for effective use, with conventional abrasive blast cleaning equipment.

Figure 3:
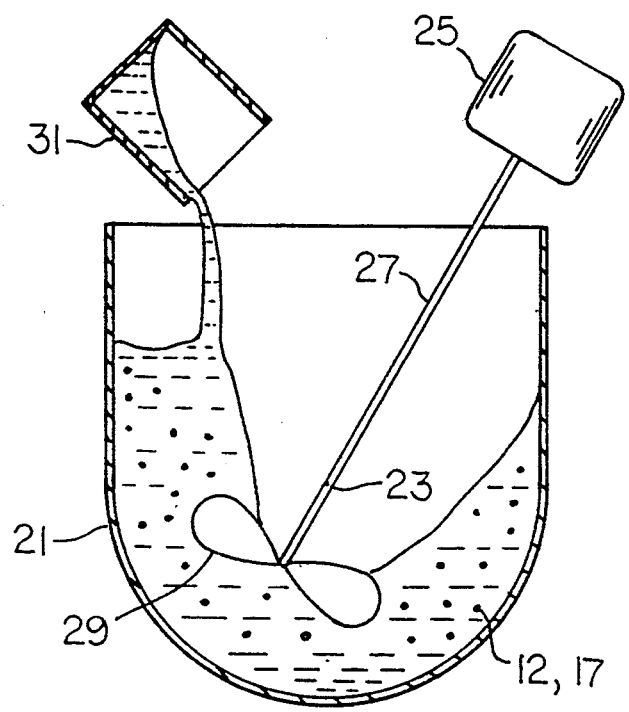
FIG. 3, is a sectional view, taken through an apparatus, that can be used in practicing the present invention.

FIG. 3, is a sectional view, taken through an apparatus, that can be used in practicing the present invention.

The present invention is concerned with, a process for producing polymer-coated abrasive particles of the type depicted in FIGS. 1 and 2. FIG. 3, shows features of an apparatus, that can be used to practice the present invention. A tank 21, is equipped with a high shear mixing and agitating device 23, that can comprise an electric motor 25, a drive shaft 27, and a propeller 29. Initially, a quantity of particulate material is fed, along with a quantity of water, into tank 21. The water contains a minor percentage of a surfactant, i.e., wetting agent. Various commercially available surfactants can be used, e.g., the non-ionic surfactant supplied by the B.A.S.F. Company, under the designation F88. Typically, the surfactant will have a one (1) percent concentration in the water.

The water containing the wetting agent is intimately mixed, with the solid particulate material, by the mixing action of the propeller 29, so that a particulate-water slurry, or suspension, is formed in tank 21. Typically, the quantity of the water is one (1), or two (2), times the quantity of the particulate matter, on a weight basis.

To the particulate-water slurry, there is added a quantity of a liquid polymer coupling agent. During this addition, the slurry is continued to be agitated by propeller 29, so that the coupling agent chemically bonds to the surfaces of the solid particles dispersed in the water. The surfactant wets the surface of the solid particles, and thus promotes the attachment of the coupling agent to the particle surfaces. The concentration of the coupling agent is less than one (1) percent. Nevertheless, the coupling agent has sufficient concentration to form coupling agent films, on the surfaces of the dispersed particles. The water acts as a dispersing agent to disperse, or separate, the solid particles from one another.

While continuing to agitate the mixture, a quantity of plastic resin monomer, (or prepolymer), is slowly introduced into the tank. FIG. 3, shows liquid monomer being poured from container 31, into the slurry containing the polymer coupling agent.

After the prepolymer is introduced into the slurry in tank 21, the agitating and mixing action is continued for a sufficient time, to effect a polymerization action between the prepolymer, water, and the coupling agent. A thin resinous polymer coating is formed on the surfaces of the dispersed solid particles. Such a coating has a relatively uniform thickness on the solid particles, as depicted in FIGS. 1 and 2. With the described process, the solid particles do not agglomerate, or bind, together to any great extent. Instead, the individual particles are coated with the polymer film, without adhering together.

The time to achieve a polymerization action will depend on the reactants, the concentrations of the reactants, and the temperature at which the process is carried out. In one instance, the polymerization time was about five (5) minutes, with the reactants at room temperature.

The preferred polymer coating is polyurethane. Using the urethane monomer, the coupling agent is silane. The urethane monomer is available from BLEND MANUFACTURING, INC., of Somersworth, N.H., under its designation "MATRIX". The polymerization reaction, taking place between the urethane monomer and silane, is described in an article, appearing in the magazine *Adhesive Age*, at pages 23 through 28, of the June, 1973 issue. Further description of the reaction appears in the *Journal of Cellular Plastics*, at pages 385 through 398, of the issue dated November–December, 1985.

The polymer coated abrasive particles can be readily separated from the slurry, and dried, for use in abrasive blast cleaning operations. The coated particles can be used in dry blast cleaning operations, or wet blast operations. Wet blast operations can be used, for example, to remove burrs from precision parts, or to produce matte finishes on work surfaces, or to remove light scale, or tool marks, from machined surfaces.

Following, are examples of materials and concentrations, on a weight basis, that have been used in the practice of the present invention.

| Example 1 | |
|---|---|
| Ground Walnut Shells or Corn Cobs | 27.60 |
| 1% Surfactant-Water Solution | 70.80 |
| Silane Coupling Agent | 0.14 |
| Urethane Prepolymer | 1.41 |
| Example 2 | |
| Garnet, Staurolite, Sand, Glass, or Ground Coal Slag | 39.10 |
| 1% Surfactant-Water Solution | 58.70 |
| Silane Coupling Agent | 0.196 |
| Urethane Prepolymer | 1.95 |
| Example 3 | |
| Plastic Media (POLYPLUS 20/30 from U.S. Technology) | 27.60 |
| 1% Surfactant-Water Solution | 70.85 |
| Silane Coupling Agent | 0.14 |
| Urethane Prepolymer | 1.41 |
| Example 4 | |
| Steel Grit, (G40 from Natural Metal Abrasives) | 48.70 |
| 1% Surfactant-Water Solution | 48.70 |
| Silane Coupling Agent | 0.236 |
| Urethane Prepolymer | 2.33 |
| Example 5 | |

-continued

| | |
|---|---|
| Aluminum Oxide | 9.76 |
| Glass Bead | 29.33 |
| 1% Surfactant-Water Solution | 58.70 |
| Silane Coupling Agent | 0.196 |
| Urethane Prepolymer | 1.95 |
| Example 6 | |
| Aluminum Oxide | 32.73 |
| 1% Surfactant-Water Solution | 65.50 |
| Silane Coupling Agent | 0.163 |
| Urethane Prepolymer | 1.63 |

The formulations of Examples 1 through 6, were processed according to the method described above. The urethane polymerized, to form a thin polymer coating on the particulate materials. The coated particulates can be used as abrasive media, in abrasive blast cleaning operations.

One advantage of the polymer coating process is, that, the coated particles have a density, not appreciably different, than the density of the core material. The following are some densities that have been achieved.

| | | RAW BULK DENSITY [pounds per cubic foot] | |
|---|---|---|---|
| ABRASIVE | MESH SIZE | UNCOATED | COATED |
| Staurolite | 50 | 128 | 86 |
| Garnet | 30–40 | 122 | 82 |
| Steel Shot | 50 | 203 | 151 |
| Ground Glass | 25–40 | 85 | 58 |
| Glass Bead | 100–170 | 102 | 49 |
| Coal Slag | fine | 93 | 46 |
| Aluminum Oxide | 240 | 107 | 56 |

In many cases it is desired to have a bulk density higher than fifty (50) pounds per cubic foot, while having a relatively soft surface hardness. Using the process of the present invention, abrasive particulates having this combination of characteristics, can be readily achieved.

In practicing the process of the present invention, it is preferred that the surfactant have a concentration of about one (1) percent in the water. Also, the liquid prepolymer should have a concentration that is about ten (10) times the concentration of the coupling agent. The prepolymer should represent about two (2) percent of the total mixture. Further, the weight concentration of the particulate material should be at least about fifteen (15) times the weight of the prepolymer. The size range of the coated particles will typically vary, from about two one-thousandths (0.002) of an inch, to about one-half (0.5) of an inch. Relatively thin polymer coatings can be achieved on the abrasive particles, so that even when the particles are in the small size range, the density of the coated particle is determined, to a large extent, by the density of the core material. The process requires relatively small quantities of the coating material, which is generally more expensive than the core material. Water is used in the process as a diluting agent, whereby relatively thin polymer films can be realized. Film thickness can be controlled by varying the concentrations of the reactants.

As previously noted, the process of the present invention, is believed to be useful for coating particles having other end uses than as abrasive blast cleaning media.

Urethane polymer is a hydrophilic material, having an affinity for water, and other liquids. The urethane polymer can be used as a protective film in certain situations, or as an absorbent material to achieve a slow release, or actuation, of the core material. In some situations, the polymer film can be used to absorb, or adsorb, noxious gases or liquids.

Figure 4:
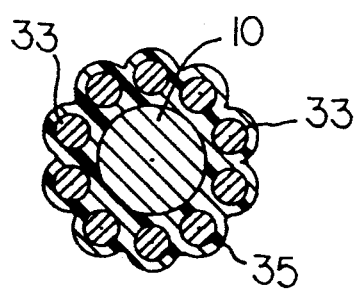
FIG. 4, is a sectional view, taken through a resin-coated agglomerate that can be formed by the process of the present invention.

FIG. 4, is a sectional view, taken through a resin-coated agglomerate that can be formed by the process of the present invention.

The process can be used to agglomerate differently sized particles within a polymer film, or shell. FIG. 4, shows a composite particle that includes a relatively large size core particle 10, a number of smaller size core particles 33, surrounding the large size particle 10, and an encapsulating polymer film, or shell 35.

The composite particle depicted in FIG. 4, can be formed by a two-step process. As the first step, a coated particle can be formed by the previously described process, i.e, by the in situ formation of a polymer film on a core particle. FIG. 1, shows the coated particle. The formulation of the coated particle can be as described in Example 6.

The second step in forming the FIG. 4 particle, involves the repetition of the coating process, using as the core material, the particles depicted in FIG. 1, together with other, uncoated, smaller size particles. The formulation used in the second step can be as follows:

| Example 7 | |
|---|---|
| Coated Particles Produced by the Process of Example 6 | 29.33 |
| Glass Beads | 9.76 |
| 1% Surfactant-Water Solution | 58.70 |
| Silane Coupling Agent | 0.196 |
| Urethane Prepolymer | 1.95 |

Using the two-step process, it is possible to form the multi-core coated particle illustrated in FIG. 4. The smaller size core particles 33, are agglomerated onto the polymer film surrounding the core particle 10. The polymer film resulting from the second step in the process acts as an encapsulant for the smaller size particles 33.

FIG. 4, is an idealized depiction of the agglomerating action. The actual core configuration and composition of the agglomerated particles are affected by the relative particle sizes and core material proportions. It is believed that the smaller sized core particles, should be between ten (10) and one-hundred (100) times smaller than the larger size core particles, in order to achieve a coated product, of the type depicted in FIG. 4.

It is contemplated that the smaller size particles 33, will be of a different material than the substrate core material 10. Depending on the intended use of the agglomerated particle, the smaller size particles 33, can, e.g., include mass transfer ingredients such as, activated carbon, proteins, plant cells, algae, an adsorbent, an absorbent, a chemical catalyst, or a complexing agent. By placing the active particles 33, around the substrate core particle 10, the active material can be located in close proximity to the ambient atmosphere. A fluidized bed containing such agglomerates can have a desired combination of controlled density and large active surface in contact with an effluent stream.

The process of the present invention can also be used to produce a long-lasting fragrance emission dispenser. The following is an example of a formulation that has been used:

| Example 8 | |
|---|---|
| Ground Walnut Shells, premixed with a 2%, by weight, lemon scent | 27.60 |
| 1% Surfactant-Water solution | 70.80 |
| Silane Coupling Agent | 0.14 |
| Urethane Prepolymer | 1.41 |

The above formulation was processed by the method of the present invention into a dry particulate form, and tested for fragrance emission. It was found that the particulate material continued to exude a lemon scent for a period of thirty days at normal room temperatures. The thin polymer film on the particles apparently acted as a slow release agent, to control the fragrance emission from the core material.

The present invention has necessarily been described with some degree of particularity, as regards materials and concentrations. However, it will be appreciated that the present invention can be practiced, using various different materials and concentrations.

The present invention describes a process for forming a thin polymer film on solid particulate material used in abrasive blast cleaning, and other applications. Features of the present invention are recited in the appended claims. The drawings herein necessarily depict specific structural and appearance features and embodiments of the coating process, and particles, useful in the practice of the present invention.

However, it will be appreciated by those skilled in the arts pertaining thereto, that the present invention can be practiced in various alternate forms, and configurations. Further, the previously detailed descriptions of the preferred embodiments of the present invention, are presented for clarity of understanding only, and no unnecessary limitations should be implied therefrom. Finally, all appropriate mechanical, process, and functional equivalents to the above, which may be obvious to those skilled in the arts pertaining thereto, are considered to be encompassed within the claims of the present invention.

What is claimed is:

1. A process of coating particulates with a polymeric coating, comprising:
    (a) mixing particulate material with water, containing a wetting agent;
    (b) adding a liquid polymer coupling agent silane, to the mixture obtained in step (a); and
    (c) agitating the mixture obtained in step (b), while adding a liquid prepolymer urethane thereto, whereby a polymeric urethane coating is formed on the particulates.

2. The process, as described in claim 1, wherein the wetting agent has a concentration of about one (1) percent in the water.

3. The process, as described in claim 1, wherein the liquid prepolymer has a concentration that is about ten (10) times the concentration of the coupling agent.

4. The process, as described in claim 1, wherein the liquid prepolymer concentration is about two (2) percent of the total mixture obtained in step (c).

5. The process, as described in claim 1, wherein the weight of the particulate material is at least fifteen (15) times the weight of the prepolymer.

6. The process, as described in claim 1, wherein step (c) is carried out at room temperature.

7. The process, as described in claim 6, wherein the mixture of step (c) is agitated for a period of about five (5) minutes, after all of the prepolymer has been added.

8. The process, as described in claim 1, wherein the particulate material comprises particles in the size range from about two one-thousandths (0.002) of an inch to about one-half (0.5) of an inch.

9. The process, as described in claim 8, wherein the particulate material has a density substantially greater than the density of the polymeric coating, whereby the density of the coated particulates is not appreciably different than the density of the uncoated particulate material.

10. The process, as described in claim 9, wherein the particulate material is selected from the group consisting of staurolite, garnet, steel shot, steel grit, glass beads, ground glass, silica, coal slag, walnut shells, corn cobs, plastic beads, aluminum oxide, silicon carbide, and cut wire.

11. The process, as described in claim 9, wherein the particulate material is a material that has abrasive cleaning capabilities.

12. The process as described in claim 1, and further comprising:
    repeating steps (a), (b) and (c), using relatively large size coated particulates obtained from step (c), together with relatively small size uncoated particulates; whereby the small size particulates are coated with a polymeric urethane coating and at the same time agglomerated onto the relatively large size particulates.

13. The process as described in claim 12, wherein the relatively small size particulates are absorbant particulates pretreated with an absorbate.

14. A process of coating particulates with a polymeric coating, comprising:
    (a) mixing particulate material with water containing a wetting agent, wherein the wetting agent has a concentration of about one percent in the water, and the particulates have a particle size in the range of from about 0.002 inch to about 0.5 inch;
    (b) adding a liquid polymer coupling agent silane to the mixture obtained in step (a); and
    (c) agitating the mixture in step (b), while adding a liquid prepolymer urethane thereto, whereby a polymeric urethane coating is formed on the particulates;
    said urethane prepolymer having a concentration that is about ten times the concentration of the coupling agent;
    the urethane prepolymer concentration being about two percent of the total mixture in step (c);
    the weight of the particulate material being at least fifteen times the weight of the prepolymer, and the particulate material has abrasive cleaning capabilities; and
    step (c) being carried out at room temperature, and the agitating activity of step (c) being continued for a period of about five minutes after all of the urethane prepolymer has been added to the mixture.

* * * * *